May 29, 1962 J. T. McNANEY 3,037,202

SYSTEM FOR PRESENTING PREDETERMINED FORMS AND RECORDING THE DESIRED INFORMATION THEREON

Filed Aug. 26, 1957

INVENTOR.
JOSEPH T. McNANEY

BY Egon W. Mueller

ATTORNEY.

United States Patent Office 3,037,202
Patented May 29, 1962

3,037,202

SYSTEM FOR PRESENTING PREDETERMINED FORMS AND RECORDING THE DESIRED INFORMATION THEREON

Joseph T. McNaney, La Mesa, Calif., assignor to General Dynamics Corporation, Rochester, N.Y., a corporation of Delaware Filed Aug. 26, 1957, Ser. No. 680,289
4 Claims. (Cl. 340—324)

This invention relates generally to a system for presenting predetermined forms, such as business forms, upon a record medium and printing desired information onto said forms.

In modern business practices, electronic data processing equipments are utilized to effect such repetitive operations as billing of customers, filling in and addressing of insurance premium notices, printing stock control information upon cards, and like activities, in which a predetermined business form may be provided into which the computer or the output of the processing equipment is programmed to insert the necessary data at the desired lines in the form. Such operations are presently being generally accomplished through use of mechanical devices. These mechanical devices have inherent inertia, complexity in moving parts, and, as a result, are slow to respond and require constant attendance and maintenance by highly trained technical people.

The present invention overcomes these disadvantages and provides through a minimal number of moving parts, a substantially electronic and light image system which establishes the desired form, then fills in necessary data or information thereupon. The data information may be provided by electronic data processing equipment and be presented as visual characters upon a cathode ray tube screen. The characters, in turn, are projected onto the record medium at the desired portion or line of the preprinted form. The signals effecting the character display, through use of an information code, will additionally have a predetermined control code, which control code will effect, in response thereto, projection onto the record medium of a particular predetermined form. The system may include the selection of one of a number of predetermined forms pre-recorded upon a film, for example. Each of the forms may be selectively illuminated and projected onto the record medium in response to the applicable control code. Following recordation of the form thereupon, the record medium is transported into position to receive information optically projected from the face of the cathode ray tube to the desired line of the form on the record medium.

In addition to the aforestated, it is an object of the invention to provide a relatively simple system of recording digital data in intelligible form.

It is an object of the invention to provide a system for high speed, substantially inertialess recordation of forms with the desired information.

It is an object of the present invention to provide a system capable of decoding digital information and presenting a predetermined form and the information to be desired thereupon in appropriate portions of the form, in a line-at-a-time optical and electronic recordation.

It is an object of this invention to provide a system capable of presenting one of a plurality of forms, such as business forms, which the system is capable of filling out with the desired information or data.

Objects and advantages other than those set forth above will be apparent when read in connection with the accompanying specification and drawings, in whch:

Figures 1, 2:
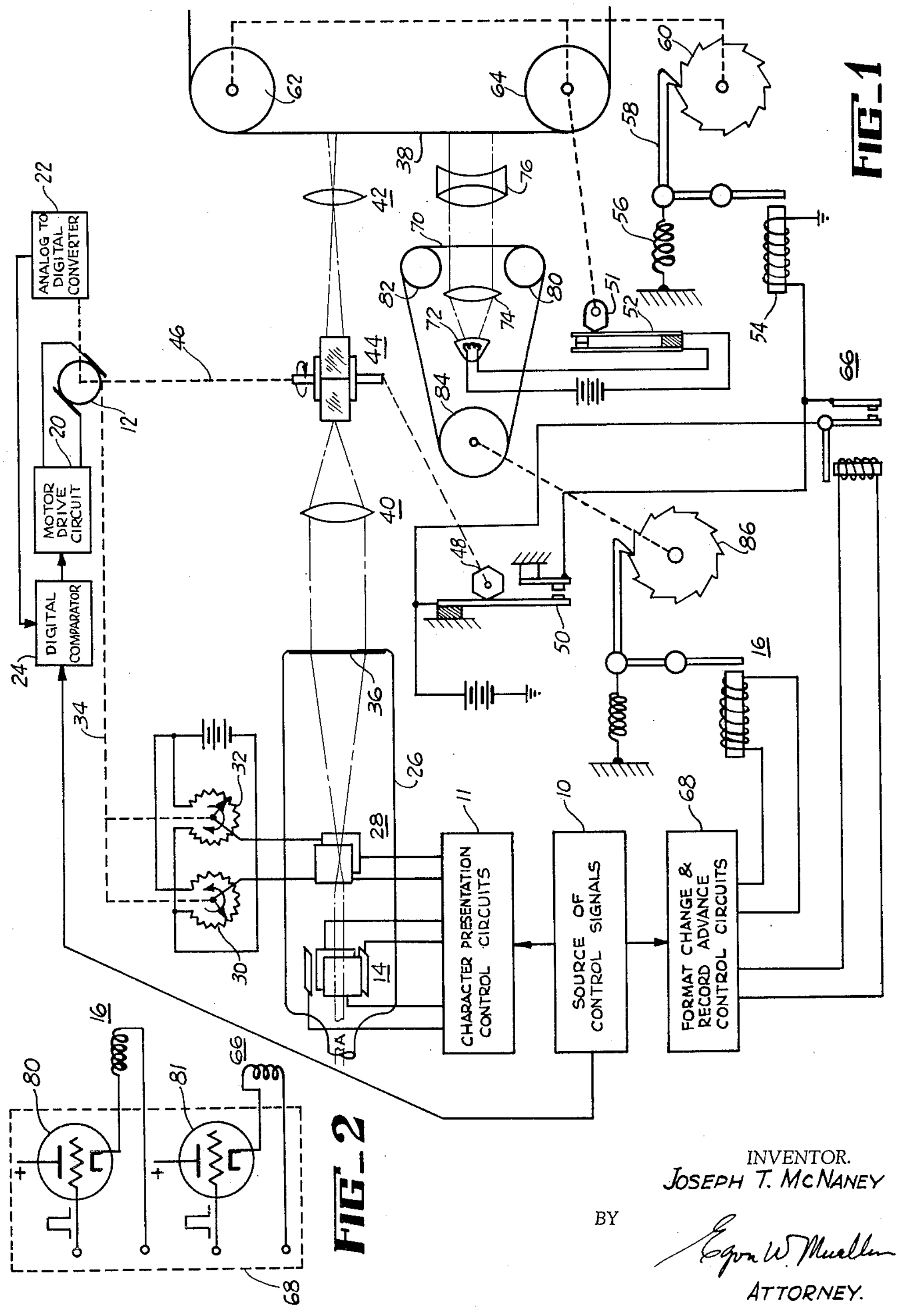
FIGURE 1 is a schematic view of a system embodying the invention.
FIGURE 2 is an exemplary schematic of that part of the circuits of FIGURE 1, which controls format change and record advance.

Referring to FIGURE 1, a source of control signals 10, which may originate from any well known electronic data processing equipment, such as, electronic computer, or, the digital output from an electronic computer recorded upon a magnetic tape, which tape may then be used as a source of control signals to operate the present system. The source of control signals 10 supplies appropriate information for example, in digital binary code, to character presentation control circuits 11. The digital code or predetermined control signals from source 10 may comprise an information code, a control code and a synchronizing code. It is well known in digital computer coding to program information, control, and synchronization codes for presentation to output equipments. The synchronizing code may be part of the information code.

The control circuits 11 responding in the main to the information code of source 10 effect operation of a cathode ray tube 26. Tube 26 may be of the Lissajous, bit-by-bit character building, or shaped beam tube, and, is exemplified in the present application as a shaped beam tube such as shown in my U.S. Patent Nos. 2,735,956 and 2,761,988. Tube 26 presents upon its screen 36 a character corresponding to the information code. The character is formed or selected symbolically by the deflection plates 14, for presentation through deflection means 28 upon the screen 36. The character may be imaged from screen 36, by lens 40 onto a rotatable optical member 44. Optical member 44, which may be either a multifaced or multisided prism or mirror, is utilized as disclosed in my copending application Serial No. 680,116, filed August 26, 1957, now Pat. No. 2,898,176, to effect lineal recordation of successively displayed characters from screen 36 onto a record medium 38. A lens 42 may be used to image the character from optical member 44 onto the medium 38. The character generation and presentation is fully disclosed and set forth in the aforestated copending application.

Summarizing briefly the character recordation, a deflection system responsive to the rotation of the optical member 44 is used to control character positioning to overcome rotative effects of the optical member 44, still achieving side by side lineal character recordation on medium 38.

The rotation of the optical member 44 is effected by a control motor 12 which, in turn, is controlled by motor circuit drive 20. The speed of control motor 12 is sensed by the analog to digital converter 22. The converter 22 presents a digital control output to the digital comparator 24. The digital comparator 24 compares the output with the synchronization code of the source of control signals 10, and arrives at a determination of any difference between them. The difference between them will control operation of motor drive circuit 20 to effect speed up or slow down of control motor 12.

Control motor 12 is also proportionately geared to and operates potentiometers 30, 32, which, with deflection means 28 comprises the deflection system. Potentiometers 30, 32, with a voltage source impressed thereacross, are rotated to effect a sawtooth voltage impressed on deflection means 28. One complete sawtooth is generated for each character to incrementally position that character upon screen 36 thereby correcting for the rotation of the optical member 44. The deflection system shown, is exemplary, and, other well known devices are also included which will effect the desired incremental positioning of each character. A sawtooth voltage generator (not shown), for example, could produce signals in response to those derived from converter 22 and control deflection means 28 accordingly.

The source of control signals 10 additionally includes form or control code, such as square wave pulses, for effecting format or business form change and effecting control of the line by line advancing of the record medium 38. A format change and record advance control circuit 68, responds to the control code, which circuit 68 is shown in an exemplified circuit in FIGURE 2.

It should be understood that FIGURE 2 exemplifies circuitry which may be used in the format change and record advance control circuits 68, and that other known circuits capable of responding to control code, such as pulses for energizing a solenoid or the like, may be used. A vacuum tube 80 may have the solenoid or load connected in the cathode thereof, in conventional cathode follower usage, the plate being positive, a pulse, such as the square wave shown on the control grid of the tube 80, will cause conduction of the tube 80 for the width of the pulse with attendant energizing of the solenoid. The solenoid energizes stepping motor 16 which, in turn, effects format change. The operation of tube 81 to selectively energize the solenoid of relay 66 in response to control code, such as square wave pulses, is similar to that described for the format change. Tube 81 exemplifies control of record advance in response to the control code.

A plurality of predetermined business forms or formats may, for example, be photographed upon a photographic film 70. The film 70 may be of a type used in motion picture or still photographic uses. Film 70 has recorded thereupon any number or kind of desired predetermined business forms for example, and may, if desired, be in the form of an endless belt. The film 70 is shown symbolically supported by rotating supports 80, 82 and driven by a driven pulley 84. When it is desired to change a particular form or format, the control code energizes stepping motor 16 through energization of the solenoid or armature of stepping motor 16. This will cause the rocker arm or pawl of the motor 16 to be attracted to the armature against a spring, rotation of the pawl causing ratchet wheel 86 to be rotated one step. The deenergizing of the solenoid causes the spring to return the pawl to its starting position having advanced one step on wheel 86. Ratchet wheel 86 is geared to driven pulley 84 and causes that pulley to rotate, thereby changing film 70 to a new position presenting the next business form on film 70.

The desired business form on film 70 may then be selectively illuminated, if desired, by a projection means including lamp 72. An On-Off light control circuit (not shown) may be included to selectively turn lamp 72 on or off as desired. The light rays from lamp 72, may be collimated through lens 74 to effect illumination of the desired form on film 70. The illuminated form is imaged through lens 76 onto record medium 38 and there recorded. Upon completion of recordation, rotation or transport of record medium 38 is effected for a distance equal to the length of a business form projected onto the medium 38 from film 70. A means responsive to the transport of medium 38 such as cam 51 and switch 52 first deenergizes and then energizes the projection means, namely the lamp 72. The cam 51, which responds to rotation or transport of record medium 38, opens switch 52 during transport and rotates to close switch 52 to illuminate the format onto the record medium 38 after the medium has advanced or been transported the predetermined amount. It can be seen that the digital code through use of pulses can, of course, select any of the desired forms recorded upon the film 70 through proper counting of the corresponding steps of the stepping motor 16, thereby selecting any one of the desired forms for projection onto the record medium.

The control circuit 68 further presents pulses from the control code to the armature or solenoid of relay 66 to effect operation thereof and to energize relay 54. The energization of relay 54 effects rotation of wheel 60 in the same manner as previously described with respect to stepping motor 16. As previously stated, the exemplary square wave pulse may be that portion of the control code which is selectively presented to tube 81 in the grid circuit. The solenoid of relay 66 is in the cathode circuit. The pulse width, of course, determines the time of conduction of the tube 81, which is sufficient to energize the armature of relay 66, to advance ratchet wheel 60 one step. The one step advance of wheel 60 causes advance also of record medium 38 by transport or rotation of drive wheels 62, 64 which are geared to or driven by movement of ratchet wheel 60. Relay 66 then permits record advance controlled by the signals from the source 10, independently of the rotation of optical member 44.

The record advance circuits include a means which is operated under the influence of the optical member 44 of the character generating means to control the energizing cycle of the transport means 54, 56, 58, 60, 62 and 64. The means effects medium 38 transport of a line upon completion of a line of recordation. Stated another way, as one face of optical member 44 completely rotates past the screen 36 the means effects a line advance of the medium. The means includes a cam 48 which has a number of projections equal to the faces or sides of the optical member 44 and is so geared to optical member that it will hold switch 50 open until a line of projection of the optical member is completed; switch 50 is then closed, and effects, through a voltage source shown in the circuit, a line of record advance. Therefore, as the optical member 44 completes its line of recordation, i.e. one face or side thereof, rotates past the screen 36, medium 38 is automatically advanced a line by transport means 48, 50, 54, 56, 58 and 60. The circuit 68 may be used to energize the armature of relay 66 to close relay 66 independently of switch 50. In operation then, whether energized independently by relay 66 or through operation of cam 48 controlled by optical member 44 in operating switch 50, solenoid 54 receives from the voltage source a current through the circuit. The energized solenoid 54, which is part of the stepping motor 54, 56, 58 and 60, will cause pawl 58 to rotate about its pivot and against the tension of a spring 56. Pawl 58, in turn, rotates the ratchet wheel 60 one step. Ratchet wheel 60, in turn, is geared to the drive wheels 62 and 64. Therefore, rotation of ratchet 60 effects rotation of drive wheels 62, 64 to advance record medium 38 a step or line-at-a-time (assuming the steps of the wheel 60 are predetermined to give the line-at-a-time advance). As previously explained, cam 51 may be geared to drive wheel 64 so that during rotation of drive wheels 62 and 64, cam 51 will open switch 52 to prevent illumination of a business form in film 70 during transport of medium 38.

In operation then of the entire system, assuming a predetermined form to be in the record location or a second predetermined location, in response to the source of control signals 10, the information code, the character presentation control signals 11 effect the selection of the corresponding character and the presentation of that character upon screen 36. Lens 40 images the character onto the rotating optical member 44. The optical member 44 with its circuits generally under control of the synchronizing or sync code and presents the character for imaging by lens 42 upon the desired position of the form on record medium 38. Rotation of the optical member 44 is effected under control of the sync code, from the source 10, and its influencing of the digital comparator 24. Comparator 24 causes the motor drive circuit 20 to control motor 12. The speed of motor 12 is sensed by the analog to digital converter 22 and compared by the comparator 24 with the sync code. Control motor 12 also causes rotation of potentiometers 30 and 32 through gear train 34 to present the sawtooth voltage to deflection means 28 to provide incremental positioning along a line compensating for the rotative effect of member 44 upon character presentation. The incremental repositioning of each character permits stationary recordation of the displayed character upon record medium 38. Each character is incrementally repositioned on screen 36 a horizontal amount of only a fraction of the average width of the character. This repositioning suffices to overcome the rotation of the member and present a stationary character to the medium for recordation.

As the optical member successively positions characters, side by side, along the line of recordation and completes that line of recordation, its control of cam 48 causes cam 48 to rotate to permit switch 50 to close. Closing of switch 50 thereupon energizes solenoid 54, which, in turn, actuates stepping motor 54, 56, 58 and 60 to rotate one step, causing similar rotation to drive wheels 62, 64 thereby advancing the record medium 38 one line.

The source of control signals 10, through the control code, selects the next desired format by presentation of pulse code to operate stepping motor 16. Motor 16 effects operation of ratchet wheel 86, which, in turn, is geared to drive wheel 84 to rotate film 70 to the desired predetermined format. Assuming record medium 38 is stationary and switch 52 is closed, lamp 72 is energized and its light rays collimated through lens 74 will illuminate the desired form, which is imaged by lens 76 for recordation upon record medium 38. In the event that record medium 38 is being transported, cam 51 will permit switch 52 to open so that illumination of a format will not take place during transport of the record medium.

Upon signal from the control circuit 68, relay 66 may, in addition, be used to close the circuit permitting the voltage source to be presented to the solenoid 54. Solenoid 54 then effects operation of pawl 58, against spring 56, to rotate ratchet wheel 60. Ratchet wheel 60, being geared to drive wheel 62, 64, will effect advance or transport of record medium 38.

As is readily apparent from the description of the invention, the format may be recorded if desired, at a first predetermined location and subsequently transported to a second predetermined location to permit the characters to be inserted in appropriate positions upon the form.

The particular embodiment of the invention illustrated and described herein is illustrative only and the invention includes such other modifications and equivalents as may readily appear to those skilled in the art, within the scope of the appended claims.

I claim:

1. A system for selectively recording upon a blank radiation responsive recording medium one of a plurality of different work forms, said plurality containing at least first and second work forms respectively containing first and second pluralities of blank areas which are arranged in different patterns within the text of said work forms, said first and second pluralities of blank areas being adapted to respectively receive first and second pluralities of groups of characters, each of said groups manifesting particular information in cooperation with the associated work form when placed in its assigned blank area comprising a source of first and second signals, each of which has a character selection control signal and a work form selection and positioning control signal, a blank radiation responsive recording medium, means connected to said signal source for selectively generating a radiation image of said first or second work form in response to the receipt of said first or second work form selection signals respectively, means for projecting the image of the selected work form upon a given area of said recording medium at a first predetermined position, means connected to said source of signals for sequentially generating one at a time the character-shaped radiation images forming said first group of characters in response to the receipt of the character selection signals of said first signal, said means being responsive to the receipt of the character selection signals of said second signal to sequentially generate one at a time the character-shaped radiation images forming said second group of characters, means for cyclically projecting the sequentially-presented character-shaped radiation images in a lineal arrangement upon the recording medium located at a second predetermined position, means for moving said recording medium so that said given area passes from said first to said second predetermined position, first means for causing said moving means to sequentially advance said record medium to sequentially present the blank areas of said first work form at said second position to thereby sequentially receive the groups of characters of said first plurality in their correspondingly assigned blank areas in response to the receipt of work form positioning control signals of said first signal, said first means being responsive to the receipt of the work form positioning control signals of said second signal for causing said moving means to sequentially advance said recording medium to thereby sequentially present the blank areas of said second work form at said second position to sequentially receive the groups of characters of said second plurality in their correspondingly assigned blank areas, and second means for causing said moving means to advance said recording medium a predetermined amount in response to the completion of a cycle of said lineal projecting means.

2. The combination of claim 1 in which said cyclical projecting means includes rotating optical means for accepting said sequentially-presented character-shaped images and redirecting them onto said recording medium so that said sequentially-presented images are arranged in a line transverse to the direction of movement of said recording medium.

3. The combination of claim 2 in which moving means is responsive to the receipt of pulses for advancing said recording medium one step at a time, said second energizing means comprising means for generating a pulse at the end of each cycle of said rotating optical means and means for applying said pulse to said moving means.

4. The combination of claim 3 in which said first energizing means comprises means connected to said pulse applying means and said source of control signals for generating pulses in response to said control code.

References Cited in the file of this patent

UNITED STATES PATENTS

| | | |
|---|---|---|
| 1,916,985 | Ogsbury et al. | July 4, 1933 |
| 2,168,047 | Skellett | Aug. 1, 1939 |
| 2,168,049 | Skellett | Aug. 1, 1939 |
| 2,541,426 | Lammers | Feb. 13, 1951 |
| 2,786,400 | Peery | Mar. 26, 1957 |
| 2,807,663 | Young | Sept. 24, 1957 |